United States Patent

Shams et al.

[11] Patent Number: 6,163,095
[45] Date of Patent: *Dec. 19, 2000

[54] DRIVE SYSTEM FOR A FROZEN FOOD PRODUCT DISPENSER

[75] Inventors: Hassan Shams, Golden Valley; James D. Vogel, Anoka, both of Minn.

[73] Assignee: IMI Cornelius Inc., Anoka, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/987,395

[22] Filed: Dec. 9, 1997

[51] Int. Cl.$^7$ ................................................ H02K 21/12
[52] U.S. Cl. ............................................................ 310/156
[58] Field of Search ................................. 310/156, 75 D, 310/103

[56] References Cited

U.S. PATENT DOCUMENTS

| | | | |
|---|---|---|---|
| 3,572,651 | 3/1971 | Harker | 366/185 |
| 3,575,536 | 4/1971 | Jacobs et al. | 310/104 |
| 3,958,968 | 5/1976 | Hosaka | 62/343 |
| 4,199,265 | 4/1980 | Sanderson et al. | 366/274 |
| 4,404,484 | 9/1983 | Gillott | 310/156 |
| 4,486,176 | 12/1984 | Tardieu et al. | 310/103 |
| 4,568,195 | 2/1986 | Herz et al. | 366/274 |
| 4,594,525 | 6/1986 | Stokes | 310/156 |
| 4,752,138 | 6/1988 | Rufer | 366/274 |
| 5,141,327 | 8/1992 | Katsumi Shiobara | 366/274 |
| 5,481,803 | 1/1996 | Guthrie et al. | 30/113.3 |
| 5,668,425 | 9/1997 | Marioni et al. | 310/162 |
| 5,682,072 | 10/1997 | Takahashi | 310/156 |
| 5,911,503 | 6/1999 | Braden et al. | 366/143 |

Primary Examiner—Nestor Ramirez
Assistant Examiner—Joseph Waks
Attorney, Agent, or Firm—Sten Erik Hakanson

[57] ABSTRACT

In one preferred embodiment, a freeze cylinder is used having a closed end and an open end. Around the cylinder adjacent the closed end, a three phase DC stator is placed. The stator is connected to a three phase DC power supply that includes an AC to DC inverter. An electrical rotor is positioned in the cylinder adjacent a spacer plate. The rotor consists of metal ring around the perimeter of which are secured eight permanent magnets. The magnets and tube are encased in a food grade plastic creating a rotor disk having a central hole. A scraper extends along the axis of the cylinder and includes a central rod end that extends through the rotor and into the bearing of the spacer disk. The scraper includes a skirt portion around the rod end for securing to the rotor. In operation, the stator and rotor constitute a three phase DC motor that is operated by the power supply to rotate the scraper within the cylinder. No dynamic seal is needed as no rod end of the scraper is required to extend out of the cylinder for mechanical connection to a drive motor. In a further embodiment, a freeze cylinder is used that also has a closed end and an open end. A conventional motor and gear drive are used, however the gear drive is adapted to rotate a circular magnetic drive plate. This external magnetic drive plate is positioned so that the magnetic surface thereof faces and is closely adjacent the exterior surface of the cylinder closed end. Within the cylinder a similar circular magnetic ring is rotatively mounted therein carried on and within a stainless steel disk. This internal disk is secured to a rod end of the scraper and the magnetic face of the magnetic ring faces the internal surface of the cylinder end and is positioned closely adjacent thereto. In operation, the external drive plate is magnetically coupled to the magnetic ring of the internal driven disk wherein rotation of the driven disk results in rotation of the scraper.

13 Claims, 6 Drawing Sheets

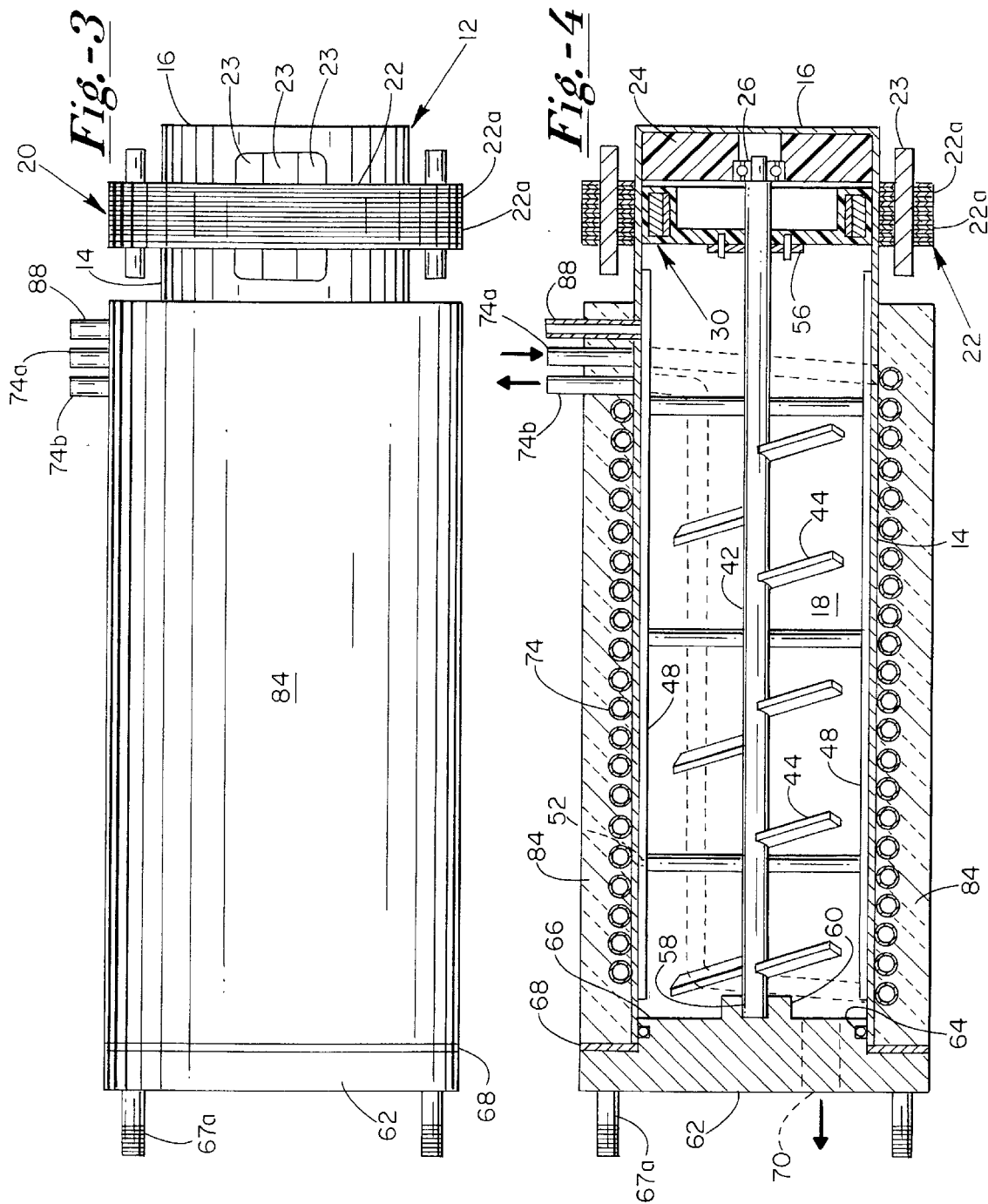

120V AC

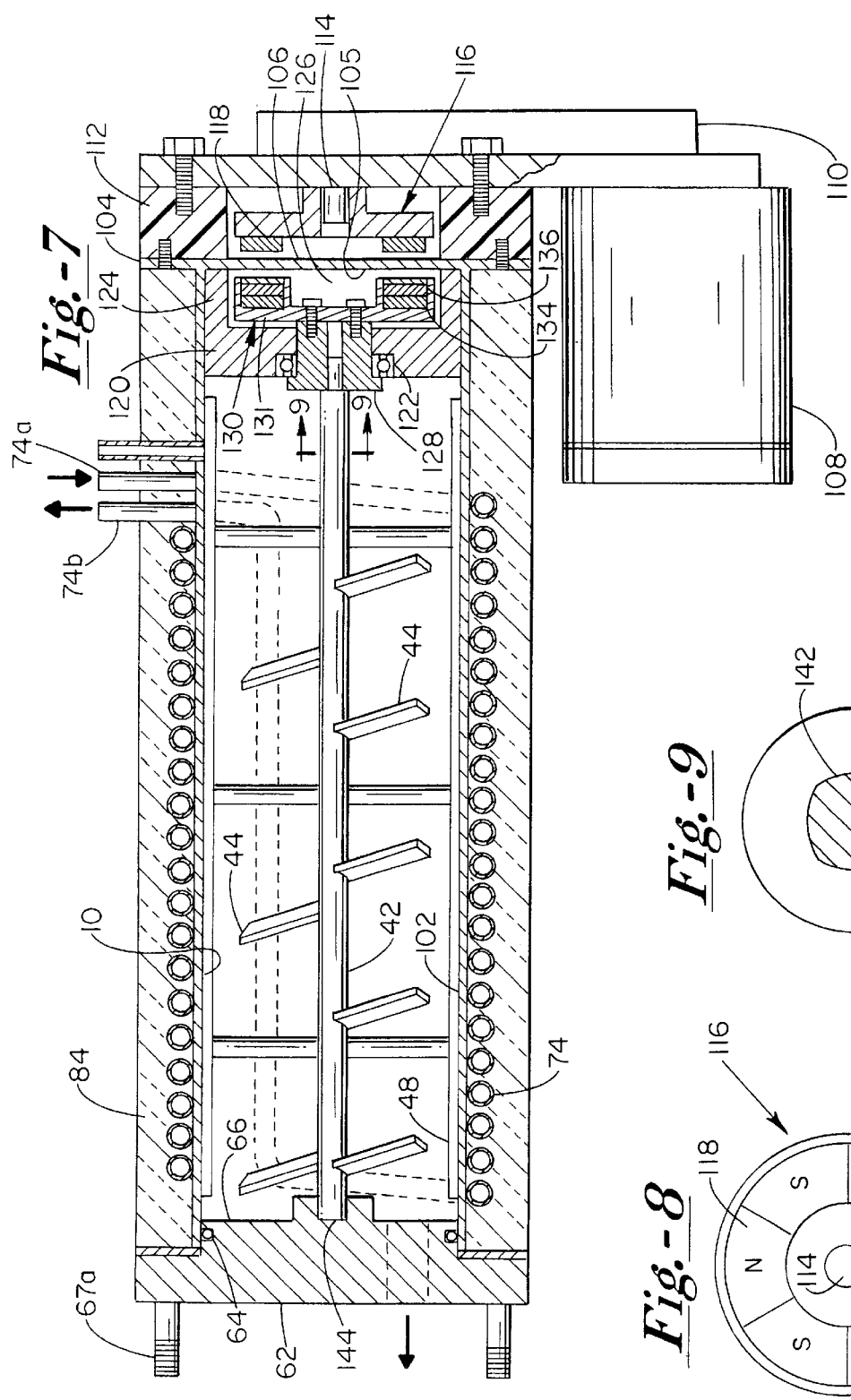

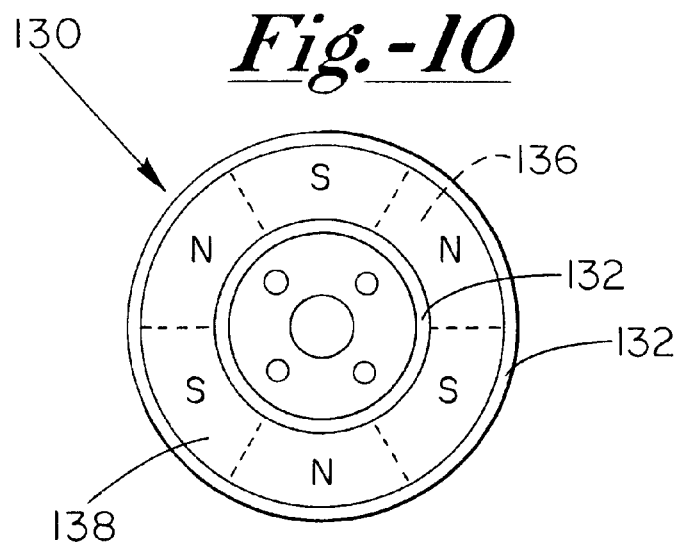
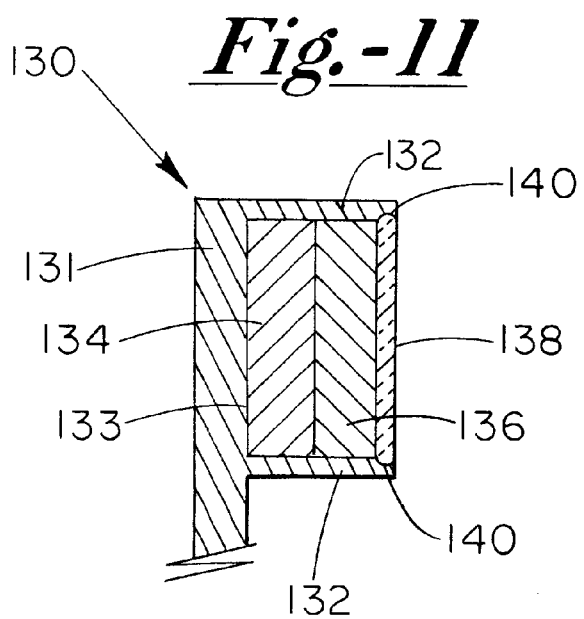

DRIVE SYSTEM FOR A FROZEN FOOD PRODUCT DISPENSER

FIELD OF THE INVENTION

The present invention relates to frozen beverage food product making and dispensing machines, and in particular to the motor drive systems therefor.

BACKGROUND

Frozen beverage or food product dispensing machines are known in the art that utilize a freezing cylinder for producing a slush beverage or frozen food product. An evaporator coil is wrapped around the exterior of the cylinder for cooling the contents thereof. A scraper mechanism extends along the central axis of the cylinder and is rotated to scrape thin iced or frozen layers of the beverage or food product from the internal surface of the cylinder. Such an approach is therefore useful for the production carbonated and noncarbonated flavored slush ice drinks as well as ice creams and frozen yogurts.

A drawback to theses machines is the fact that the scraper mechanism inherently requires a shaft portion thereof to extend through a cylinder end for connection to a drive motor, thereby requiring a dynamic seal. This requirement stems from the fact that the drive mechanism is exterior of the cylinder and can not come into direct contact with the food product therein. Naturally, such seals are subject to wear and consequent leaking, especially where the beverage contents are under pressure, as is the case for a frozen carbonated beverage. Major service problems with such machines are related to failed or leaking scraper shaft seals. Accordingly, it would be very desirable to be able to eliminate such seals, yet have a scraper drive mechanism that does not create food compatibility/contact problems, and that has sufficient strength to operate the scraper against the considerable resistance it encounters when producing the desired frozen food product.

SUMMARY OF THE INVENTION

In one preferred embodiment of the present invention, a freeze cylinder is used having a closed end and an open end. Around the cylinder adjacent the closed end a three phase DC stator is placed. The stator is connected to a three phase DC power supply that includes an AC to DC inverter. An evaporator is coiled around substantially the remainder of the exterior of the cylinder and connected to a mechanical refrigeration system. A spacer plate has a central bearing and is positioned within the cylinder against the closed end thereof. A rotor is positioned in the cylinder adjacent the spacer plate. The rotor consists of metal ring around the perimeter of which are secured eight permanent magnets. The magnets are equidistantly spaced and alternate as to their polarity. The magnets and ring are encased in a food grade plastic creating a rotor disk having a central hole. A scraper extends along the axis of the cylinder and includes a central rod end that extends through the rotor and into the bearing of the spacer disk. The scraper includes a skirt portion around the rod end for securing to the rotor. The open end of the cylinder is sealed in the conventional manner with a plate which includes a valve for dispensing beverage from the interior volume of the cylinder and a rotational support for the opposite end of the scraper central rod. A delivery line provides for delivery of the beverage from a source thereof into the cylinder through a beverage inlet fitting.

In operation, it can be understood that the stator and rotor constitute a three phase DC motor that is operated by the power supply to rotate the scraper within the cylinder. Those of skill will readily appreciate that no dynamic seal is needed as no rod end of the scraper is required to extend out of the cylinder for mechanical connection to a drive motor. In addition, prior art machines require a gear case between the actual drive motor and the scraper rod. This mechanism is also eliminated by the present invention. Accordingly, the present invention provides for a machine that requires less in the way of service calls and that is thereby less expensive to operate. Encasing the rotor in a food grade plastic permits that portion of the motor to reside within the cylinder thereby making the motor an integral part of the cylinder. In addition, by not having the standard drive motor and gear case, the drive of the present invention permits a more compact design for the beverage machine.

In a further embodiment of the present invention, a freeze cylinder is used that also has a closed end and an open end. A conventional motor and gear drive are used, however the gear drive is adapted to rotate a circular magnetic drive plate. That plate includes a plurality of permanent magnets of alternating polarity secured on one surface thereof in a circular arrangement. This external magnetic drive plate is positioned so that the magnetic surface thereof faces and is closely adjacent the exterior surface of the cylinder closed end. Within the cylinder a similar circular magnetic ring is rotatively mounted therein on and within a stainless steel disk. This internal magnetic driven disk is secured to a rod end of a scraper and the magnetic face of the driven disk faces the internal surface of the cylinder end and is positioned closely adjacent thereto.

In operation, the motor is used to rotate the external magnetic drive plate. The external drive plate is magnetically coupled to the magnetic ring of the internal driven disk wherein rotation is imparted to the scraper. Thus, this embodiment of the present invention provides for a magnetic drive of the scraper wherein no dynamic seal is required. The internal magnetic ring is sealed from contact with the food product by the food compatible stainless steel and plastic collar, thereby permitting the use of that essential magnetic drive component within the cylinder. This "face to face" orientation of the two magnetic plates provides for a strong magnetic interaction there between. In addition, this orientation permits the use of a standard shaped cylinder having a flat end plate. Thus, no altered or extended cylinder geometry's thereof are needed to accommodate magnetic drive approaches wherein the driven magnetic element is positioned within the circumference or internal area as defined by an external driving magnetic element.

DESCRIPTION OF THE DRAWINGS

A better and further understanding of the structure, function and the objects and advantages of the present invention can be had by reference to the following detailed description which refers to the following figures, wherein:

FIG. 3 shows a plan view of the frozen food product cylinder assembly including the first drive mechanism of the present invention.

FIG. 4 shows a cross-sectional view of the cylinder and drive assembly of FIG. 3.

FIG. 7 shows a cross-sectional view of a frozen food product cylinder assembly including a further drive embodiment of the present invention.

FIG. 8 shows a surface plan view of a magnetic drive disk of the present invention.

FIG. 9 shows a cross-sectional view along lines 9—9 of FIG. 7

FIG. 10 shows a surface plan view of a magnetic driven disk of the present invention.

FIG. 11 shows an enlarged cross-sectional view of the driven disk of the present invention.

DETAILED DESCRIPTION OF THE PREFERRED EMBODIMENT

Figure 1:
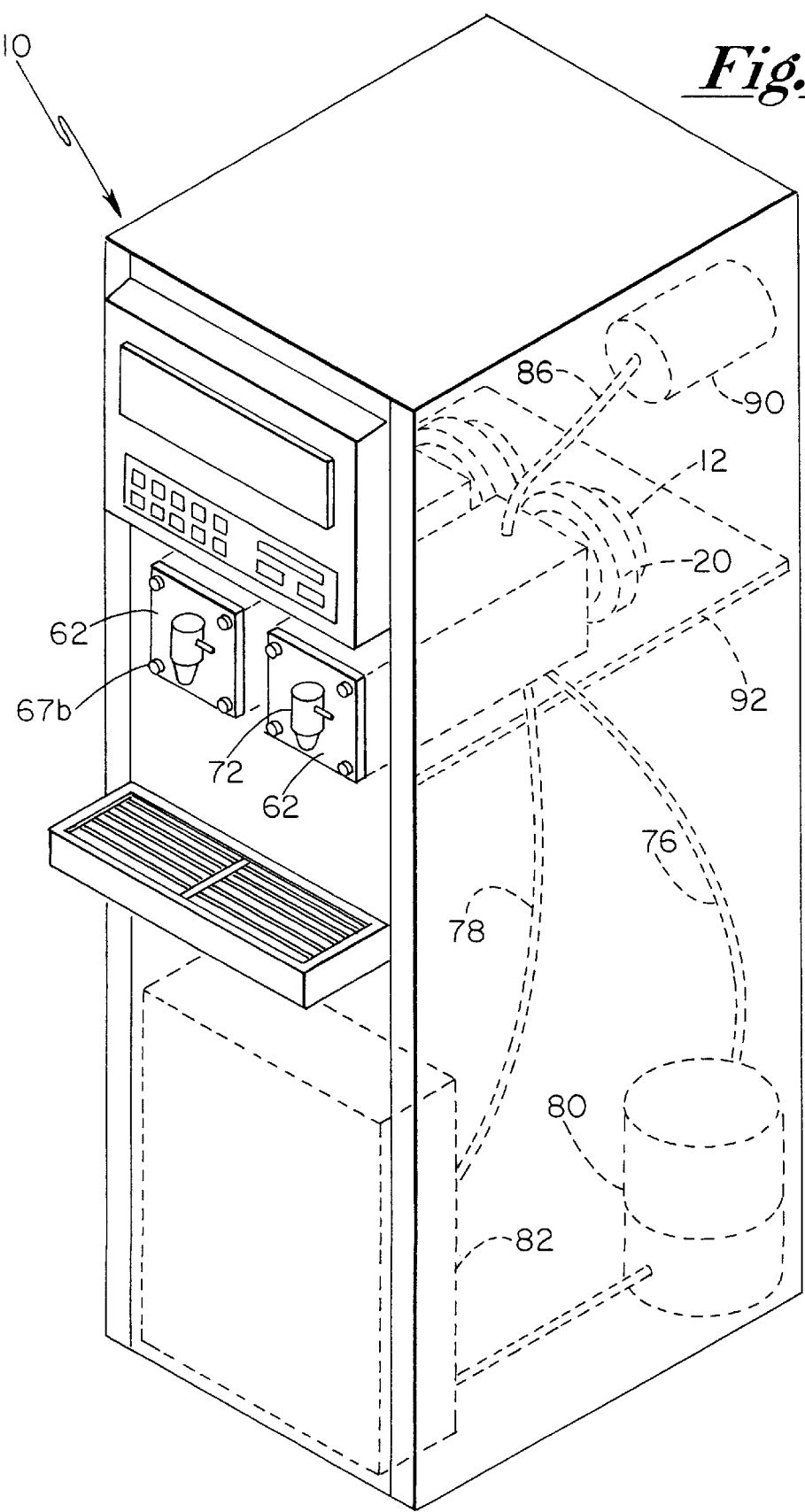
FIG. 1 shows a perspective view of a frozen food product dispensing machine.
Figure 2:
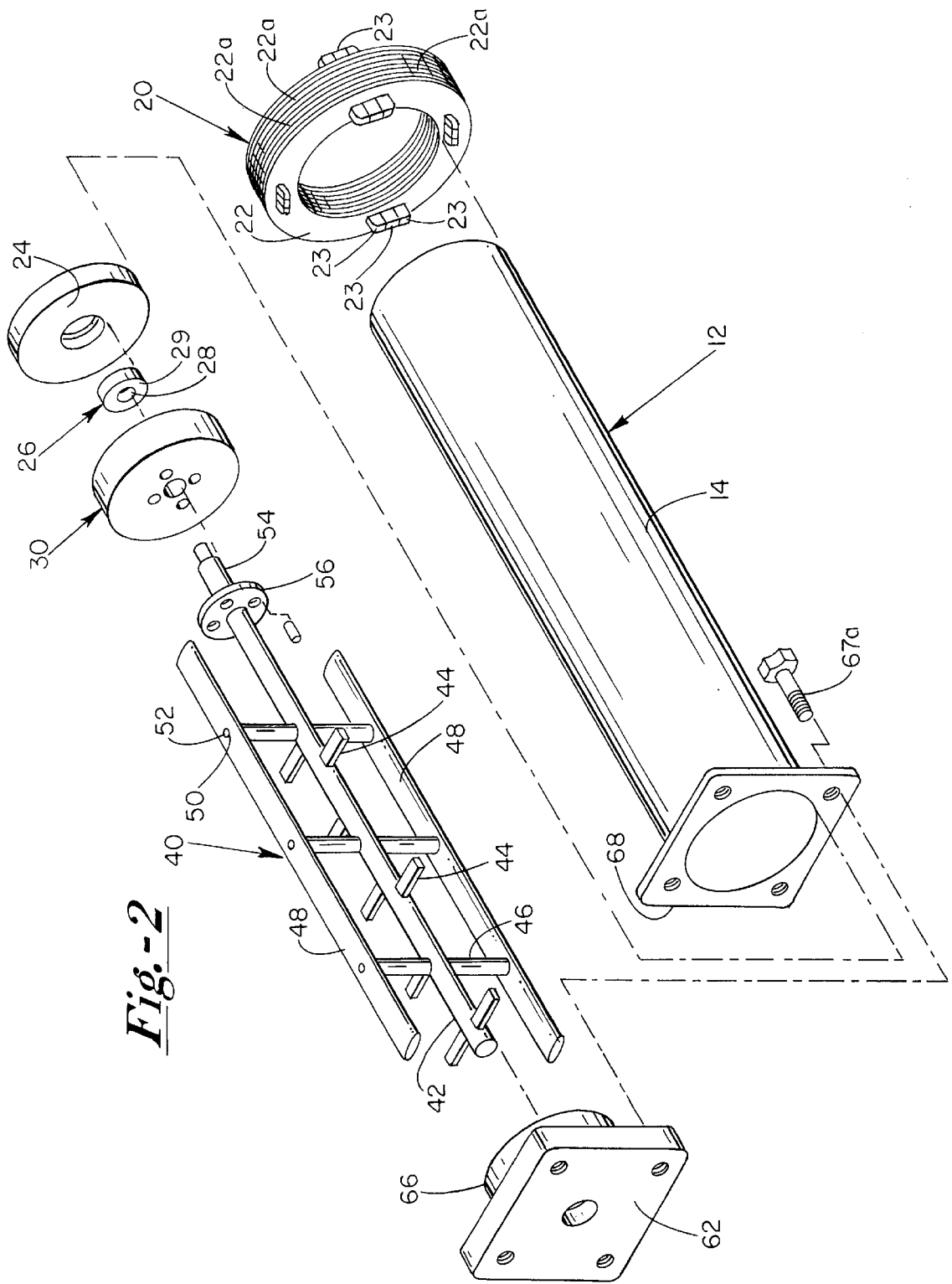
FIG. 2 shows an exploded view of a frozen food product cylinder assembly in conjunction with a first drive mechanism of the present invention.

A frozen food product making and dispensing machine is seen in FIG. 1, and generally referred to by the number 10. Machine 10 is illustrative of the type wherein the present invention can be applied. As seen by also referring to FIGS. 2–4, a stainless steel cylinder 12 includes a cylindrical wall 14 and a stainless steel plate 16 welded to one end thereof forming a closed end surface and defining a cylinder interior 18. A three phase stator 20 includes a ring portion 22 made of multiple metal lamination layers 22a to which three electrical windings 23 are wound and braided there around. Stator 20 is positioned on the end of cylinder 12 adjacent end wall 16 with cylinder wall 14 extending through the center thereof.

Figure 5:
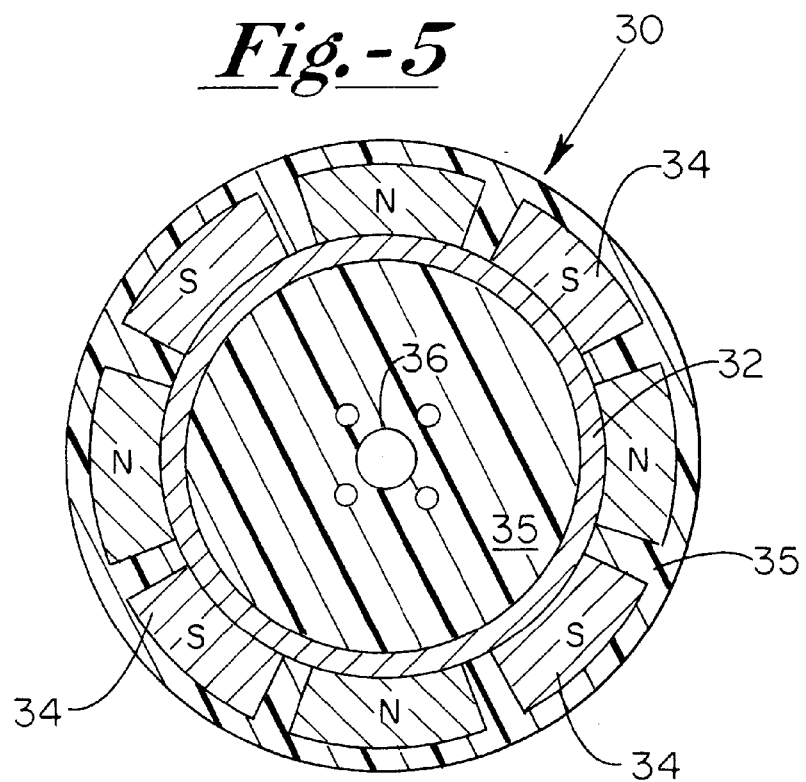
FIG. 5 shows a cross-sectional view of the rotor of FIG. 2.

A plastic spacer disk 24 is located within cylinder 12 and is positioned against end wall 16. Disk 24 is made of a suitable food grade plastic and includes a bearing 26 mounted centrally thereof. As understood by also referring to FIG. 5, a rotor 30 includes a metal tube ring section 32 having eight permanent magnets 34 secured equidistantly around a perimeter thereof wherein the North and South polarities thereof alternate. Ring 32 and magnets 34 are encased in a food grade plastic 35, such as Delrin®, molded there around and leaving a central shaft hole 36.

A scraper mechanism 40, also made of a suitable food grade plastic, includes a central shaft 42 having a plurality of mixing rods 44 and scraper blade supports 46 extending therefrom. A pair of scraper blades 48 are mounted on supports 46 wherein holes 50 thereof receive pin portions 52 of supports 46. Shaft end portion 54 extends through hole 36 and is received in hole 28 of bearing 26. Shaft 42 also includes an attachment skirt 56 for securing thereof to rotor disk 30. An opposite end 58 of shaft 42 is received in a short support section 60 integral with extending from a plastic end cover 62. Cover 62 includes an o-ring 64 extending around a cylinder inserting portion 66 thereof. Cover 62 is secured to cylinder 12 by a plurality of bolts 67a and nuts 67b. Flange 68, as with plate 16, is also made of stainless steel and welded to cylinder 12. As is known in the art, cover 62 includes a hole 70 for receiving a dispensing valve 72.

As is understood by those of skill, an evaporator coil 74 extends around the exterior of cylinder 12 and includes an inlet fitting 74a and an outlet fitting 74b. Fittings 74a and 74b are connected to high pressure line 76 and low pressure line 78 respectively of a mechanical refrigeration system including a compressor 80 and a condenser 82. Insulation 84 extends around cylinder 12 and evaporator 74. A beverage inlet line 86 is connected to a cylinder inlet fitting 88 and a beverage reservoir or mixing tank 90. A pair of cylinders 12 can be secured within the housing of dispenser 10 and supported therein by a framework 92 thereof.

Figure 6:
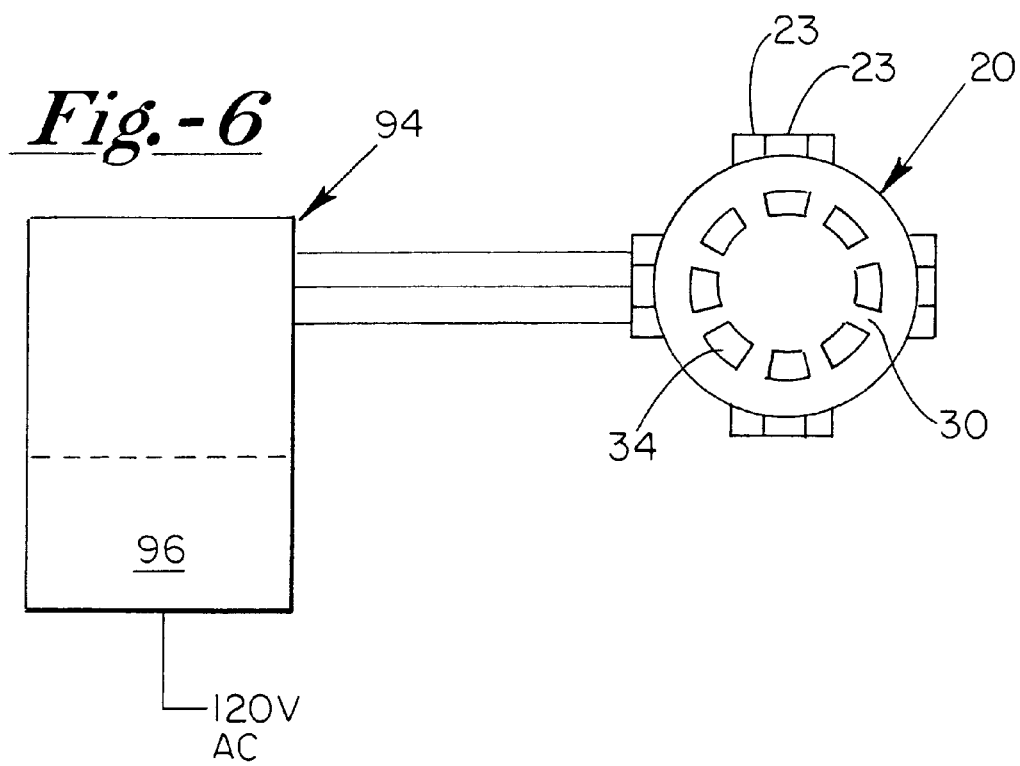
FIG. 6 shows an electrical schematic for the first drive mechanism.

As seen in the schematic of FIG. 6, a power supply 94 includes an inverter 96 for converting 220 VAC to a three phase DC current. This three phase current is connected to the three windings 23 of stator 20. Thus, those of skill will understand that stator 20 and rotor 30 comprise a DC motor. In operation, therefore, the three phase current induces movement of rotor 30 which, in turn, rotates scraper mechanism or assembly 40. Thus, with a beverage, for example, delivered within cylinder 12 through line 86 and cooling thereof by evaporator 74 and its associated refrigeration system, frozen beverage can be produced by scraping thereof from the interior surface of cylinder 12. The use of a rotor around which a food grade plastic has been molded permits that part of the DC drive motor to be internal of the cylinder and in contact with the food product. In general, all the components of the present invention are made of or coated with a suitable food grade material. Thus, the present invention comprises a drive mechanism for a frozen food product machine utilizing an internally scraped cylinder wherein the drive motor therefore is an integral part of the cylinder assembly. As a result, no dynamic seal or external shaft bearing is needed for the scraper mechanism. Thus, the traditional external motor, dynamic seal, external shaft bearing and transmission can be eliminated.

In one example of the integral DC motor drive embodiment of the present invention, the drive motor is used in a cylinder that is approximately 15 inches long with a diameter of approximately 4.5 inches. The drive motor in such an application is designed to produce a torque of approximately 110 inch/lbs. at 100 RPM's.

In a second embodiment of the present invention, as seen in FIGS. 7–11, a cylinder 100 has an internal cylinder wall 102 and an end plate 104. End plate 104 includes and interior surface 105 and an exterior surface 106. An AC motor 108 is secured to a transmission 110 which is in turn secured to a plastic collar 112 attached to plate 104. Transmission 110 includes a drive shaft 114 to which is attached a magnetic drive disk 116. As seen by also referring to FIG. 8, disk 116 includes six permanent magnets 118 secured thereto around a perimeter of one side or face thereof wherein the North and South polarities thereof alternate. Magnets 118 are positioned to face and be held closely adjacent exterior end surface 106.

Within cylinder 100 a food grade plastic spacer 120 is positioned against interior end wall 105. Spacer 120 includes a central bearing 122 and includes an annular wall portion 124 defining a disk retaining space 126. A food grade plastic collar 128 is received in stainless steel bearing 122 and on one end thereof has a driven magnetic disk 130 secured thereto. As seen by also referring to FIGS. 10 and 11, disk 130 includes a stainless steel carrier portion 131 which has sidewalls 132 defining a carrier retaining space or annular groove 133. A ferromagnetic ring 134 is secured to carrier 131 within space 133 and a plurality of magnets 136 are secured to ring 134. As with magnets 118, magnets 136 are permanent and arranged with alternating polarities. A plastic collar or ring covering 138 is secured to walls 132 for snap fitting engagement in returns 140 thereof for sealably enclosing magnets 136 and ring 134 within annular groove 133. Magnets 136 of disk 130 are positioned to face and lie closely adjacent the interior surface 105 of end wall 104.

As with the first drive embodiment described above, the second drive embodiment also includes a scraper mechanism 40 having a central shaft 42 having a plurality of mixing rods 44 and scraper blade supports 46 extending therefrom. A pair of scraper blades 48 are mounted on supports 46 wherein holes 50 thereof receive pin portions 52 of supports 46. A shaft end portion 140 is shaped as seen in FIG. 9, to provide for driving receiving thereof in a similarly shaped bore 142 of collar 128. As with the previously described embodiment, an opposite end 144 of shaft 42 is received in support 60 extending from plastic end cover 62. Flange 68, as with plate 104, is also made of stainless steel and welded to cylinder 100.

As with the previously described DC motor embodiment, cylinder 100 includes an evaporator coil 74 extending there around that includes an inlet fitting 74a, an outlet fitting 74b and a food product/beverage inlet 88 for connection as stated above. Insulation 84 also extends around cylinder 100 and evaporator 74. A pair of cylinders 100 can be secured within the housing of dispenser 10 and supported therein by a framework 92 thereof.

In operation, motor 108 operates through transmission 110 to rotate drive magnetic disk 116. Due to the magnetic coupling between disk 116 and 130 as they face each other on opposite sides of end wall 104, rotation of disk 116 results in the rotation of disk 130, and hence, rotation of scraper mechanism or assembly 40. Thus, with beverage or food product delivered within cylinder 100 through line 86 and cooling thereof by evaporator 74 and its associated refrigeration system, frozen beverage can be produced by scraping thereof from the interior surface of cylinder 100. This magnetic drive embodiment, as with the DC motor embodiment herein, eliminates the need for a dynamic seal and an external bearing with respect to the shaft 42 of the scraper mechanism 40. Also, as the carrier portion 131 is made of stainless steel, and where the annular groove 134 thereof receives the magnets and ring wherein those components are sealed therein by food grade plastic ring 138, permit the driven disk 130 to be in contact with food product, i.e. permits a magnetic drive approach or mechanism that is food compatible.

We claim:

1. A frozen food product producing and dispensing machine, comprising:

a refrigerated cylinder having an interior space, said interior space defined by an interior perimeter cylindrical surface and by opposite first and second cylinder closed ends, an electrical stator secured around an exterior of the cylinder adjacent the first closed end thereof, an electrical rotor rotatively mounted within the cylinder interior space and located therein adjacent the first cylinder closed end so that provision of an electrical current to the stator induces rotational movement of the rotor a scraper extending axially within the cylinder interior spacer and pivotally mounted therein on a first end thereof to the rotor and on a second end thereof to the cylinder second end so that said induced rotational movement of the rotor imparts a rotational movement to the scraper, and the scraper having one or more scraper blades positioned closely against the interior perimeter cylindrical surface for harvesting a frozen portion of a food product retained within the cylinder interior as the result of said rotation of the scaper, and a dispensing valve mechanism secured to the cylinder for permitting regulated dispensing of the food product from the cylinder interior space.

2. The machine as defined in claim 1, and the stator having three windings for use with three phase DC current.

3. The machine as defined in claim 2, and the rotor comprising a disk and having a plurality of permanent magnets secured to and placed equidistantly around an outer perimeter thereof.

4. The machine as defined in claim 3, and the electrical rotor encased within a food compatible plastic.

5. The machine as defined in claim 1, and the rotor comprising a disk having a plurality of permanent magnets secured to and placed equidistantly around an outer perimeter thereof.

6. The machine as defined in claim 5, and the rotor encased in a food compatible material.

7. The machine as defined in claim 1 and the second closed end comprising a plate removably and fluid tightly securable thereto and the dispensing valve mechanism secured to the removable plate.

8. The machine as defined in claim 7, and the stator having three windings for use with three phase DC current.

9. The machine as defined in claim 8, and the rotor comprising a disk having a plurality of permanent magnets secured to and placed equidistantly around an outer perimeter thereof.

10. The machine as defined in claim 9, and the rotor encased in a food compatible material.

11. The machine as defined in claim 1, and the dispensing valve mechanism retained in the second cylinder end and the second cylinder end being a removable plate.

12. The machine as defined in claim 11, and the rotor comprising a disk and having a plurality of permanent magnets secured to and placed equidistantly around an outer perimeter thereof.

13. The machine as defined in claim 12, and the electrical rotor encased within a food compatible plastic.

* * * * *